US008873508B1

(12) United States Patent
Oroskar

(10) Patent No.: US 8,873,508 B1
(45) Date of Patent: Oct. 28, 2014

(54) ASSIGNING A RESOURCE TO A WIRELESS COMMUNICATION DEVICE BASED ON SOFT HANDOFF CAPABILITIES

(75) Inventor: Siddharth S. Oroskar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 334 days.

(21) Appl. No.: 12/909,165

(22) Filed: Oct. 21, 2010

(51) Int. Cl.
*H04W 4/00* (2009.01)

(52) U.S. Cl.
USPC .......................... 370/331; 455/436; 455/442

(58) Field of Classification Search
USPC ........................................................ 370/331
See application file for complete search history.

(56) References Cited

U.S. PATENT DOCUMENTS

| | | | |
|---|---|---|---|
| 5,369,681 A | 11/1994 | Boudreau et al. | |
| 5,778,319 A | 7/1998 | Sawaki | |
| 5,787,347 A | 7/1998 | Yu et al. | |
| 5,974,327 A | 10/1999 | Agrawal et al. | |
| 5,978,463 A | 11/1999 | Jurkevics et al. | |
| 6,069,871 A | 5/2000 | Sharma et al. | |
| 6,181,945 B1 | 1/2001 | Lee | |
| 6,185,421 B1 | 2/2001 | Alperovich et al. | |
| 6,223,042 B1 | 4/2001 | Raffel | |
| 6,243,590 B1 | 6/2001 | Reddy et al. | |
| 6,289,227 B1 | 9/2001 | Shi | |
| 6,295,451 B1 | 9/2001 | Mimura | |
| 6,549,787 B1 * | 4/2003 | Ravi | 455/525 |
| 6,556,831 B1 * | 4/2003 | Buppelmann | 455/456.2 |
| 6,643,520 B1 | 11/2003 | Park et al. | |
| 6,745,039 B1 | 6/2004 | Di Lalla | |
| 6,907,245 B2 | 6/2005 | Ohlsson et al. | |
| 6,922,561 B2 | 7/2005 | Chen et al. | |
| 6,963,750 B1 | 11/2005 | Cheng et al. | |
| 7,065,361 B1 | 6/2006 | Fortuna | |
| 7,099,689 B2 | 8/2006 | Bahl et al. | |
| 7,177,658 B2 | 2/2007 | Willenegger et al. | |

(Continued)

FOREIGN PATENT DOCUMENTS

| | | |
|---|---|---|
| EP | 2 244 502 | 10/2010 |
| WO | 01/47287 | 6/2001 |

OTHER PUBLICATIONS

Hasswa et al., "Generic Vertical Handoff Decision Function for Heterogeneous Wireless Networks," IFIP Int. Conf. Wireless and Optical Communications Network (WOCN), pp. 239-243 (Mar. 6, 2005).

(Continued)

*Primary Examiner* — Yemane Mesfin
*Assistant Examiner* — Jeff Banthrongsack

(57) ABSTRACT

Methods and devices for assigning a resource to a wireless communication device (WCD) based on soft handoff capabilities are presented. In particular, a radio access network (RAN) component, such as a base station controller (BSC) may receive call initiation requests from multiple WCDs. Some of these WCDs may be eligible for channel-assignment-into-soft-handoff (CASHO), wherein a WCD is assigned multiple traffic channels from multiple wireless coverage areas during call initiation procedures. However, the RAN component may take into account the effects of CASHO on WCDs with limited wireless coverage. Thus, if CASHO procedures could result in one or more WCDs not being assigned a traffic channel, the RAN component may refrain from performing CASHO, or at least refrain from performing CASHO to its full extent, in order to assign at least one traffic channel to other WCDs.

18 Claims, 7 Drawing Sheets

(56) References Cited

U.S. PATENT DOCUMENTS

| | | |
|---|---|---|
| 7,260,415 B1 | 8/2007 | Oh |
| 7,317,706 B1 | 1/2008 | Hao et al. |
| 7,317,920 B2* | 1/2008 | Rajkotia et al. ............... 455/450 |
| 7,349,699 B1 | 3/2008 | Kelly et al. |
| 7,366,526 B2 | 4/2008 | Zhang et al. |
| 7,471,654 B2 | 12/2008 | Mueckenheim et al. |
| 7,853,260 B2 | 12/2010 | Holma et al. |
| 8,254,981 B2 | 8/2012 | Dwyer et al. |
| 2001/0034233 A1 | 10/2001 | Tiedemann, Jr. et al. |
| 2004/0002340 A1 | 1/2004 | Lim et al. |
| 2004/0037264 A1 | 2/2004 | Khawand |
| 2004/0087305 A1 | 5/2004 | Jiang et al. |
| 2004/0125768 A1 | 7/2004 | Yoon et al. |
| 2004/0192306 A1 | 9/2004 | Elkarat et al. |
| 2004/0252669 A1 | 12/2004 | Hosein |
| 2005/0164718 A1 | 7/2005 | Rajkotia et al. |
| 2005/0233746 A1 | 10/2005 | Laroia et al. |
| 2006/0058056 A1 | 3/2006 | Das et al. |
| 2006/0073834 A1* | 4/2006 | Thorson ........................ 455/450 |
| 2006/0094423 A1 | 5/2006 | Sharma et al. |
| 2006/0116125 A1 | 6/2006 | Buckley et al. |
| 2006/0142032 A1 | 6/2006 | Derakhshan et al. |
| 2006/0142051 A1 | 6/2006 | Purnadi et al. |
| 2006/0160551 A1 | 7/2006 | Matoba et al. |
| 2006/0274685 A1 | 12/2006 | Johnson et al. |
| 2007/0053336 A1 | 3/2007 | Petrovic et al. |
| 2007/0105535 A1 | 5/2007 | Jacobson et al. |
| 2007/0173252 A1 | 7/2007 | Jiang |
| 2007/0232330 A1 | 10/2007 | Ranganathan |
| 2008/0025235 A1 | 1/2008 | Mahany et al. |
| 2008/0032713 A1 | 2/2008 | Yang |
| 2008/0081623 A1 | 4/2008 | Burgan et al. |
| 2008/0096520 A1 | 4/2008 | Benco et al. |
| 2008/0233945 A1 | 9/2008 | Gummadi et al. |
| 2008/0293419 A1 | 11/2008 | Somasundaram et al. |
| 2008/0293437 A1 | 11/2008 | Ranganathan et al. |
| 2009/0016328 A1 | 1/2009 | Peisa et al. |
| 2009/0061854 A1 | 3/2009 | Gillot et al. |
| 2009/0247137 A1 | 10/2009 | Awad |
| 2009/0285113 A1 | 11/2009 | Yavuz et al. |
| 2010/0120437 A1 | 5/2010 | Foster et al. |
| 2010/0246532 A1 | 9/2010 | Olvera-Hernandez et al. |
| 2010/0246534 A1* | 9/2010 | Vargantwar et al. .......... 370/332 |
| 2010/0268674 A1 | 10/2010 | Dwyer et al. |
| 2010/0311420 A1 | 12/2010 | Reza et al. |
| 2011/0021195 A1 | 1/2011 | Cormier et al. |
| 2011/0021197 A1 | 1/2011 | Ngai |
| 2011/0034167 A1 | 2/2011 | Ben-Shaul et al. |
| 2012/0003969 A1* | 1/2012 | Anderson et al. .......... 455/414.2 |
| 2012/0213123 A1 | 8/2012 | Futaki |
| 2012/0282931 A1 | 11/2012 | Giustina et al. |

OTHER PUBLICATIONS

NTT DoCoMo et al., "IDLE Mode Mobility Control Principles," 3GPP TSG RAN WG2 #59BIS; 3GPP Draft; R2-074001, 8 pages, Oct. 8-12, 2007.
NTT DoCoMo et al., "Load Balancing Solutions for LTE," 3GPP TSG RAN WG2 #58bis; 3GPP Draft; R2-072719, 5 pages, Jun. 22, 2007.
International Search Report and Written Report for PCT/US2012/028070 mailed May 7, 2012, 15 pages.
Office Action for U.S. Appl. No. 13/044,794 mailed Jul. 18, 2012, 22 pages.
TIA Standard, "Interoperability Test Specification for cdma2000® Air Interface," TIA-1036, Section 3.11, Jan. 2005.
TR45, "Inter-Operability Specification (IOS) for CDMA 2000 Access Network Interfaces," TIA/EIA/IS-2001-A, Sections 2.2.2.2, 3.4.1, 3.4.3.1.11, and 3.4.9, Jun. 2001.
Office Action for U.S. Appl. No. 12/815,700 dated Dec. 14, 2011, 9 pages.
Vargantwar et al., U.S. Appl. No. 12/815,700, filed Jun. 15, 2010, 41 pages.
Shah et al., U.S. Appl. No. 12/553,661, filed Sep. 3, 2009, 33 pages.
Oroskar et al., U.S. Appl. No. 12/558,359, filed Sep. 11, 2009, 36 pages.
Oroskar et al., U.S. Appl. No. 12/572,829, filed Oct. 2, 2009, 40 pages.
Oroskar et al., U.S. Appl. No. 12/690,629, filed Jan. 20, 2010, 38 pages.
Oroskar et al., U.S. Appl. No. 12/756,027, filed Apr. 7, 2010, 34 pages.
Oroskar et al., U.S. Appl. No. 12/776,287, filed May 7, 2010, 36 pages.
Oroskar et al., U.S. Appl. No. 12/786,174, filed May 24, 2010, 42 pages.
Oroskar et al., U.S. Appl. No. 12/786,184, filed May 24, 2010, 42 pages.
Vondekamp et al., U.S. Appl. No. 11/535,870, filed Sep. 27, 2006, 29 pages.
Office Action for U.S. Appl. No. 11/535,870 dated Apr. 3, 2009, 14 pages.
Final Office Action for U.S. Appl. No. 11/535,870 dated Nov. 12, 2009, 22 pages.
Advisory Action for U.S. Appl. No. 11/535,870 dated Feb. 18, 2010, 14 pages.
Office Action for U.S. Appl. No. 12/853,730 dated Jan. 18, 2012, 13 pages.
3rd Generation Partnership Project 2 "3GPP2", "Source-Controlled Variable-Rate Multimode Wideband Speech Codec (VMR-WB), Service Options 62 and 63 for Spread Spectrum Systems," 3GPP2 C.S0052-A, Version 1.0, Apr. 22, 2005, 198 pages.
Office Action for U.S. Appl. No. 12/815,709 dated Feb. 21, 2012, 5 pages.
Cai, L. et al., "Mitigating DoS Attacks on the Paging Channel by Efficient Encoding in Page Messages," In: Proceedings of 5th International ICST Conference on Security and Privacy in Communication Networks (SecureComm 2009) Sep. 2009, 20 pages.
TIA Standard, "Interoperability Test Specification for cdma2000® Air Interface," TIA-1036, Section 3.11, Jan. 2005, 4 pages.
TR45, "Inter-Operability Specification (IOS) for CDMA 2000 Access Network Interfaces," TIA/EIA/IS-2001-A, Sections 2.2.2.2, 3.4.1, 3.4.3.1.11, and 3.4.9, Jun. 2001, 24 pages.
Vargantwar et al., U.S. Appl. No. 12/815,709, filed Jun. 15, 2010, 42 pages.
Bhan et al., U.S. Appl. No. 12/261,229, filed Oct. 30, 2008, 55 pages.
Oroskar et al., U.S. Appl. No. 12/853,730, filed Aug. 10, 2010, 48 pages.
Vargantwar et al., U.S. Appl. No. 12/847,198, filed Jul. 30, 2010, 36 pages.
Oroskar et al., U.S. Appl. No. 12/854,119, filed Aug. 10, 2010, 54 pages.
Oroskar et al., U.S. Appl. No. 12/854,114, filed Aug. 10, 2010, 48 pages.
Oroskar, Siddharth S., U.S. Appl. No. 12/909,165, filed Oct. 21, 2010, 35 pages.
Office Action for U.S. Appl. No. 13/010,387 mailed Apr. 29, 2013, 22 pages.
Office Action for U.S. Appl. No. 13/044,794 mailed Jun. 20, 2013, 11 pages.
Final Office Action for U.S. Appl. No. 13/044,794 mailed Jan. 3, 2013, 22 pages.
Fennell, Shawn, U.S. Appl. No. 11/499,581, filed Aug. 4, 2006, 12 pages.
Oroskar et al., U.S. Appl. No. 13/010,387, filed Jan. 20, 2011, 40 pages.
Oroskar et al., U.S. Appl. No. 13/044,794, filed Mar. 10, 2011, 51 pages.

* cited by examiner

ASSIGNING A RESOURCE TO A WIRELESS COMMUNICATION DEVICE BASED ON SOFT HANDOFF CAPABILITIES

BACKGROUND

Some types of wireless network technologies, such as Code Division Multiple Access (CDMA) technologies, allow a wireless communication device (WCD) to communicate via multiple wireless coverage areas simultaneously. For example, a radio access network (RAN) may transmit copies of the same bearer data to the WCD via traffic channels from each of several wireless coverage areas. This approach can increase the likelihood that the WCD will receive at least one copy of the bearer data. Additionally, the WCD may be able to combine two or more received copies of the bearer data such that the WCD can decode the received bearer data more reliably than if the WCD received only one copy of the bearer data. An analogous procedure may be used for bearer data transmitted by the WCD.

The wireless coverage areas with which a WCD is actively communicating may be referred to as the WCD's active set. As the WCD moves from place to place, or as the signal strengths that the WCD receives from members of its active set fluctuate, the RAN may add members to or remove members from the active set. The process of doing so may be referred to a "soft handoff."

While soft handoff procedures are typically used mid-call, the RAN may also be able to assign traffic channels from multiple wireless coverage areas to a WCD at the beginning of a call. This technique, sometimes referred to as channel assignment into soft handoff (CASHO), may improve initial call quality, thereby increasing user satisfaction with the wireless service.

OVERVIEW

A potential downside to CASHO is that it may result in a sub-optimal assignment of traffic channels to WCDs. For instance, assigning multiple traffic channels to a single WCD may be inefficient or unfair when traffic channel resources are scarce. For example, assigning a given WCD multiple traffic channels may result in there being few or no traffic channels left for other WCDs. Consequently, these other WCDs may experience call failures, or may end up roaming to another service provider's coverage area. Although the latter outcome is usually preferable to the former, the WCD's service provider or the WCD's user may be assessed fees for the WCD's roaming activities. Therefore, it is generally desirable for traffic channel resources to be assigned to WCDs in an equitable fashion, so that WCDs in situations where CASHO is an option are not assigned multiple traffic channels to the detriment of other WCDs.

Accordingly, in an example embodiment, a RAN may receive a first call initiation message from a first WCD. The RAN may also receive a second call initiation message from a second WCD. Through these call initiation messages, the first and second WCDs may seek one or more resource (e.g., traffic channel) assignments.

In response to receiving the call initiation messages, the RAN may determine that the first WCD and second WCD are contending for a first resource available in a first wireless coverage area of the RAN. For instance, the first wireless coverage area may have only one unassigned traffic channel. Thus, in this case, the RAN would be unable to assign resources from the first wireless coverage area to both of the first and second WCDs.

The RAN may also determine that the first WCD cannot be assigned any resource available in a second wireless coverage area of the RAN. For example, if the first WCD can only receive signals of a sufficient strength from the first wireless coverage area, the first WCD cannot be assigned resources from the second wireless coverage area.

The RAN may further determine that the second WCD can be allocated either or both of the first resource and a second resource available in the second wireless coverage area. In other words, the second WCD can be assigned a resource from the first wireless coverage area, the second wireless coverage area, or via CASHO procedures, both of these wireless coverage areas.

In response to making these determinations, the RAN may allocate the first resource to the first WCD and allocate the second resource to the second WCD. In this way, the RAN assigns at least one resource to each WCD. In doing so, the RAN may forego opportunities to perform CASHO procedures for the second WCD, or may perform CASHO procedures to only a limited extent. Consequently, the first WCD may be assigned a resource where it otherwise would not have been assigned the resource.

These and other aspects and advantages will become apparent to those of ordinary skill in the art by reading the following detailed description, with reference where appropriate to the accompanying drawings. Further, it should be understood that this overview and other description throughout this document is merely for purposes of example and is not intended to limit the scope of the invention as claimed.

DESCRIPTION

I. Network Architecture

Figure 1:
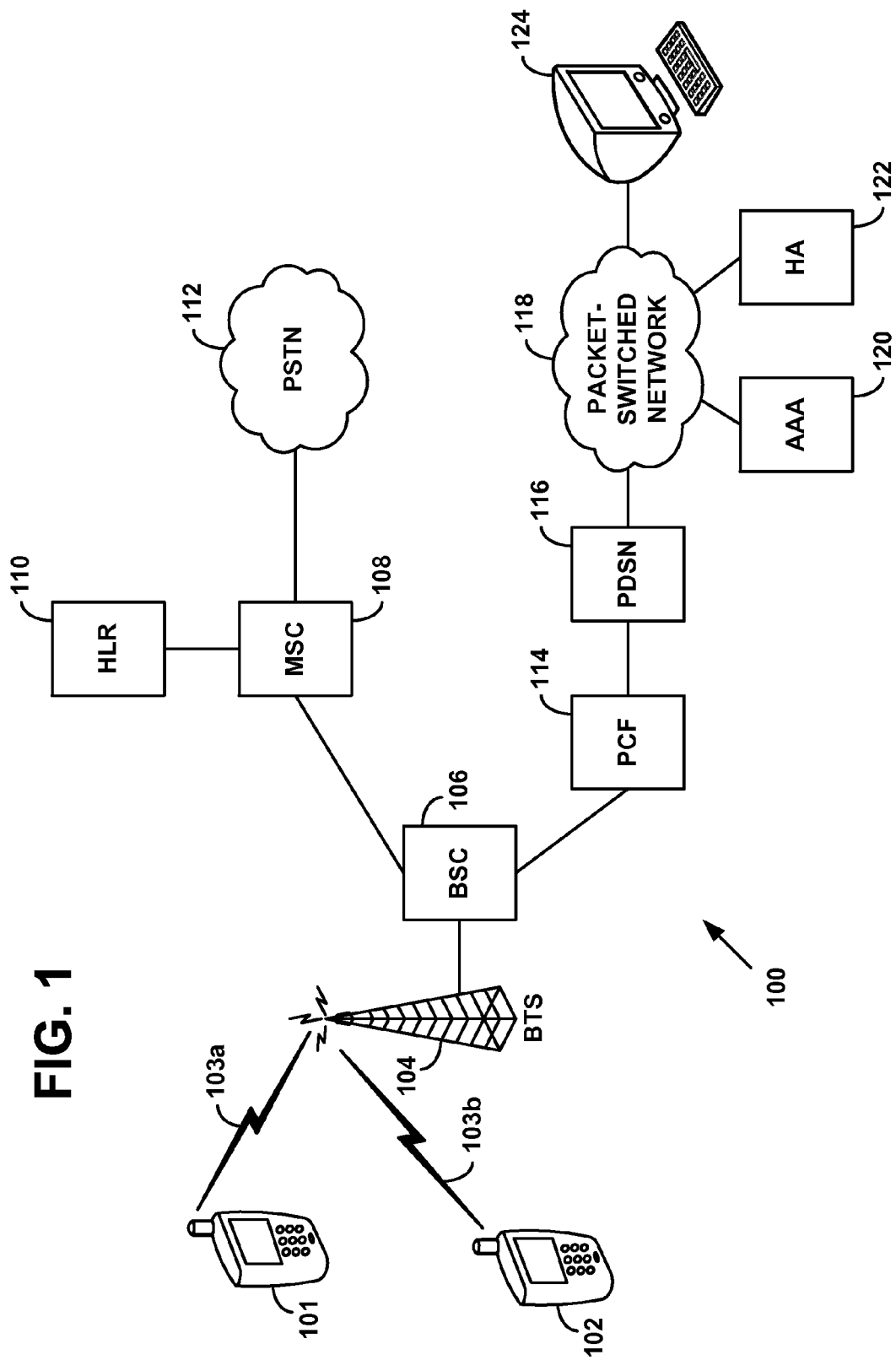
FIG. 1 depicts a RAN, in accordance with an example embodiment.

FIG. 1 shows a simplified block diagram of a wireless communication system 100 in which example embodiments can be employed. WCD 101 may communicate over an air interface 103*a* with a base transceiver station (BTS) 104, which is, in turn, coupled to or integrated with a base station controller (BSC) 106. Similarly, WCD 102 may communicate over an air interface 103*b* with BTS 104. Transmissions over air interface 103*a* from BTS 104 to WCD 101 and over air interface 103*b* from BTS 104 to WCD 102 may represent "forward links" to the WCDs. Conversely, transmissions over air interface 103*a* from WCD 101 to BTS 104 and over air interface 103*b* from WCD 102 to BTS 104 may represent "reverse links" from the WCDs.

BSC 106 may be connected to a mobile switching center (MSC) 108. BSC 106, MSC 108, or both, may act to control assignment of air interface traffic channels, and may provide access to wireless circuit-switched services such as circuit-voice and circuit-data services. As represented by its connection to publically-switched telephone network (PSTN) 112, MSC 108 may also be coupled with one or more other MSCs or other telephony circuit switches, thereby supporting user mobility across MSC regions, as well as local and long-distance landline telephone services. A home location register (HLR) 110, which may be connected to MSC 108, may support mobility-related aspects of subscriber services, including dynamic tracking of subscriber registration location and verification of service privileges.

As shown, BSC 106 may also be connected with a packet-data serving node (PDSN) 116 by way of a packet control function (PCF) 114. PDSN 116, in turn, provides connectivity with a packet-switched network 118, such as the Internet and/or a wireless carrier's private core packet-network. Nodes on network 118 may include, by way of example, an authentication, authorization, and accounting (AAA) server 120, a mobile-IP home agent (HA) 122, and a remote computer 124.

After acquiring a traffic channel over air interface 103a, WCD 101 may transmit a request to PDSN 116 for a connection to the packet data network. Then, following authentication of WCD 101 by AAA server 120, WCD 101 may be assigned an IP address by the PDSN or by HA 122, and may thereafter engage in packet-data communications with entities such as remote computer 124. Similar procedures may take place, via air interface 103b, for WCD 102.

Figure 2:
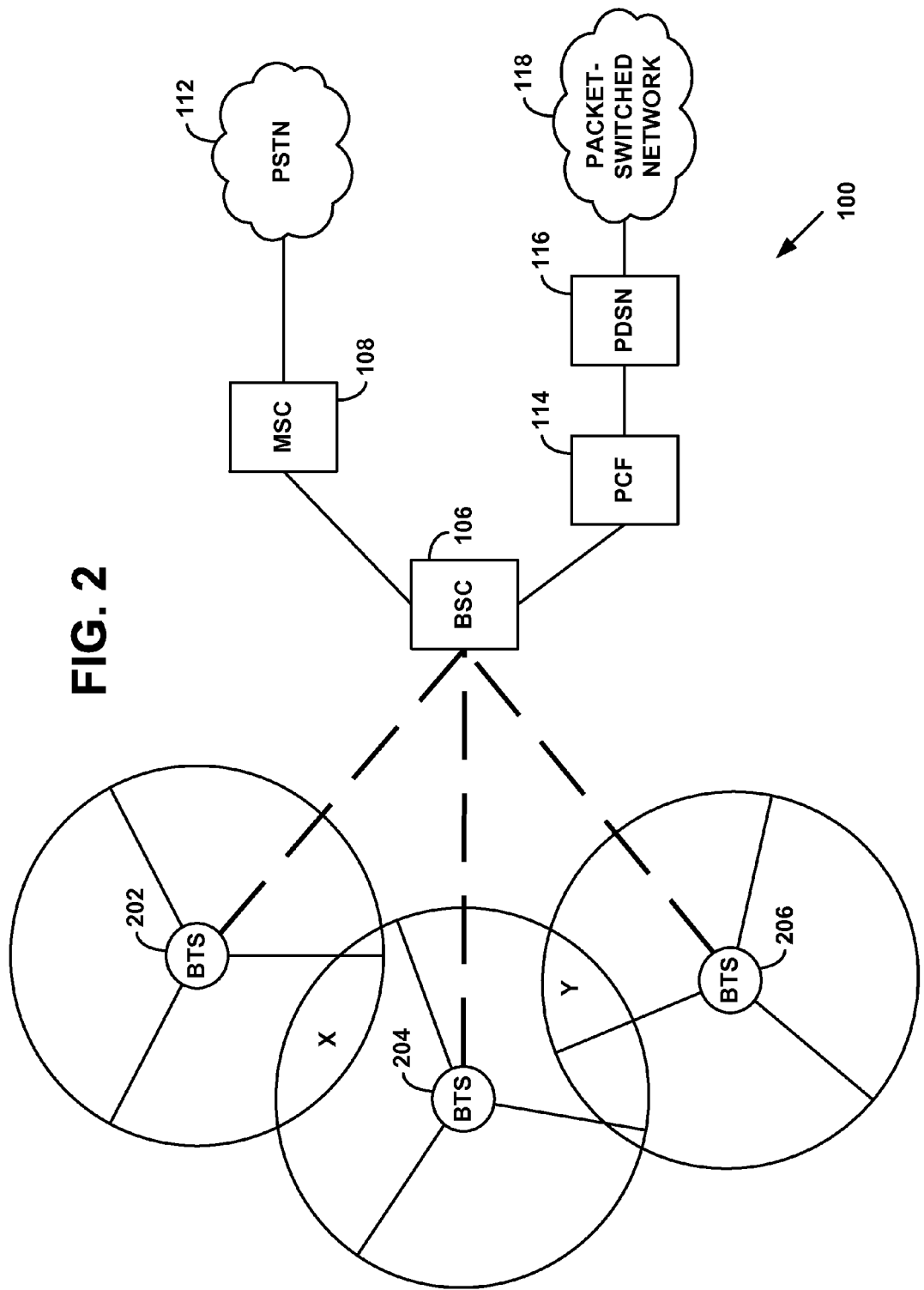
FIG. 2 depicts a RAN with several wireless coverage areas, in accordance with an example embodiment.

In practice, a BSC may serve multiple BTSs, each of which may define one or more wireless coverage areas. An example of such an arrangement is illustrated in FIG. 2, which shows BSC 106 in network 100 coupled with BTSs 202, 204, and 206. Each BTS is shown at the core of a respective circle representing wireless coverage areas, with each circle divided into three pie-shaped pieces representing individual wireless coverage areas. With this arrangement, a WCD may operate in any of the wireless coverage areas and can connect, via a serving BTS, with MSC 108 for circuit-based services and/or via PCF 114 and PDSN 116 for packet-based services. Note that the depiction of three wireless coverage areas per BTS in FIG. 2 is intended to be for purposes of example, and other numbers of wireless coverage areas per BTS are possible. Further, the relative positions of the BTSs and the relative angular orientations of the wireless coverage areas are also illustrative, and other arrangements may be used. Moreover, a BTS's overall wireless coverage may not be circular, and may take on other shapes and arrangements instead.

A WCD may receive the same bearer data simultaneously from more than one wireless coverage area. To illustrate how this may occur, FIG. 2 includes points X and Y. While in the vicinity of point X, a WCD may be able to receive signals from wireless coverage areas of BTS 202 and BTS 204. Similarly, while in the vicinity of point Y, a WCD may be able to receive signals from wireless coverage areas of BTS 204 and BTS 206. It should be noted that, in practice, a WCD located at or near points X or Y may be able to receive signals (and therefore simultaneously receive the same bearer data) from more than two wireless coverage areas.

In general, the depictions of both FIGS. 1 and 2 are illustrative. Therefore, in a RAN, there could be more or fewer of each element than is shown, and some elements may be omitted altogether. Additionally, other types of elements not shown may be present. Further, any of these elements may be combined with one another, physically or logically, or distributed across multiple physical devices. Thus, the particular arrangement shown in FIG. 1 should not be viewed as limiting with respect to the present invention. For instance, BSC 106 may be replaced by one or more radio network controllers (RNCs), and MSC 108 may be replaced, in whole or in part, by one or more softswitch and/or media gateway components.

Figure 3:
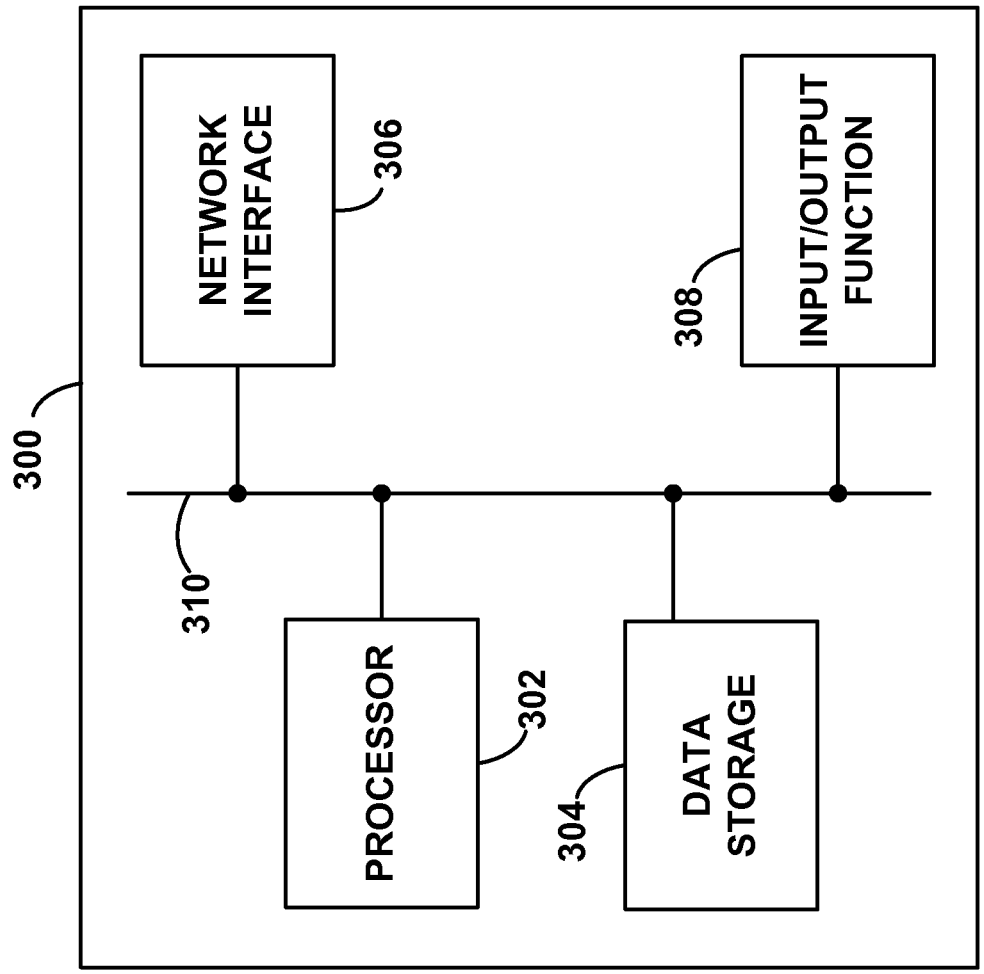
FIG. 3 is a block diagram of a RAN component, in accordance with an example embodiment.

FIG. 3 is a simplified block diagram exemplifying a RAN component 300, illustrating some of the functional elements that may be found in a RAN arranged to operate in accordance with the embodiments herein. RAN component 300 could be any type of device found in or associated with a RAN, such as a BTS, a BSC, or an MSC. For purposes of illustration, this specification may equate RAN component 300 to a BSC from time to time. Nonetheless, it should be understood that the description of RAN component 300 could apply to any component used for the purposes described herein.

RAN component 300 may include a processor 302, a data storage 304, a network interface 306, and an input/output function 308, all of which may be coupled by a system bus 310 or a similar mechanism. Processor 302 may include one or more CPUs, such as one or more general purpose processors and/or one or more dedicated processors (e.g., application specific integrated circuits (ASICs) or digital signal processors (DSPs), etc.)

Data storage 304, in turn, may comprise volatile and/or non-volatile data storage and can be integrated in whole or in part with processor 302. Data storage 304 may store program instructions, executable by processor 302, and data that is manipulated by these instructions to carry out the various methods, processes, or functions described herein. Alternatively, these methods, processes, or functions can be defined by hardware, firmware, and/or any combination of hardware, firmware and software. By way of example, the data in data storage 304 may contain program instructions executable by processor 302 to carry out any of the methods, processes, or functions disclosed in this specification or the accompanying drawings.

Network interface 306 may take the form of a wireline connection, such as an Ethernet, Token Ring, or T-carrier connection. Network interface 306 may also take the form of a wireless connection, such as IEEE 802.11 (Wifi), BLUETOOTH®, or a wide-area wireless connection. However, other forms of physical layer connections and other types of standard or proprietary communication protocols may be used over network interface 306. Furthermore, network interface 306 may comprise multiple physical interfaces.

Input/output function 308 may facilitate user interaction with example RAN component 300. Input/output function 308 may comprise multiple types of input devices, such as a keyboard, a mouse, a touch screen, and so on. Similarly, input/output function 308 may comprise multiple types of output devices, such as a monitor, printer, or one or more light emitting diodes (LEDs). Additionally or alternatively, example RAN component 300 may support remote access from another device, via network interface 306 or via another interface (not shown), such an RS-232 or USB port.

II. CDMA Communications

The present invention will be described by way of example with reference to Code Division Multiple Access (CDMA) communications. However, it should be understood that the invention can apply to other families of protocols now known or developed in the future.

In a CDMA wireless network, each wireless coverage area may employ one or more frequency bands, typically 1.25 MHz in bandwidth each, and each wireless coverage area may be distinguished from adjacent wireless coverage areas by a pseudo-random number offset ("PN offset"). Further, each wireless coverage area may concurrently communicate on multiple channels that are distinguished from one another by different CDMA codes (i.e., different Walsh codes). When a WCD operates in a given wireless coverage area, communications between the WCD and the BTS of the wireless coverage area may be carried on a given frequency and may also be encoded by the wireless coverage area's PN offset and a given Walsh code.

Air interface communications in a wireless coverage area may be divided into forward link communications and reverse link communications. On the forward link, certain Walsh codes may be reserved for defining control channels, including a pilot channel, a sync channel, and one or more paging channels, and the remainder may be assigned dynamically for use as traffic channels, i.e., to carry user communications such as email web browsing, voice, video, and so on. Similarly, on the reverse link, one or more Walsh codes may be reserved for use to define access channel(s), and the remainder may be assigned dynamically for use as traffic channels.

A WCD may communicate with a number of "active" wireless coverage areas at a time. Depending on the type and/or configuration of the RAN, the number of active wireless coverage areas may be from one to six. However, more than six active wireless coverage areas may be used without departing from the scope of this invention. The WCD may maintain a list of the active wireless coverage areas, identified according to their PN offsets. This list may be referred to as the WCD's "active set."

A RAN may be arranged to transmit the same bearer data to a given WCD concurrently via some or all of the wireless coverage areas in the given WCD's active set, encoding each transmission according to the PN offset of the respective wireless coverage area and the Walsh code for the assigned channel therein. Correspondingly, the WCD may decode forward link transmissions from each wireless coverage area using the respective wireless coverage area's PN offset together with the WCD's respectively allocated Walsh code for the wireless coverage area. The concurrent transmissions in wireless coverage areas of the active set provides an added level of reliability to communications, as well as possibly increased quality owing to improved signal-to-noise characteristics. The concurrency also facilitates a form of seamless handoff between wireless coverage areas, referred to as "soft handoff" when the handoff is between wireless coverage areas of different BTSs, and "softer handoff" when the handoff is between wireless coverage areas of the same BTS. (For sake of simplicity, only the term "soft handoff" will be used in the following discussion.)

In addition to its active set, the WCD may maintain a list of "candidate" wireless coverage areas (typically up to six, but more is possible), which includes wireless coverage areas that are not in the WCD's active set but that have sufficient signal strength such that the WCD could demodulate signals from those wireless coverage areas. Further, the WCD may maintain a list of "neighbor" wireless coverage areas that are not in its active set or candidate set, but in close vicinity to the WCD and deemed by the RAN to be wireless coverage areas that the WCD should monitor for eligibility as candidate wireless coverage areas. Other wireless coverage areas that are not in the WCD's active set, candidate set, or neighbor set may be members of a "remaining" set.

To facilitate a determination of which wireless coverage areas should be in the WCD's active and candidate sets, each BTS may emit a pilot channel signal per each wireless coverage area the respective BTS defines. The WCD may constantly, or from time to time, measure the strength of each pilot channel signal that it receives and may notify the RAN when a received pilot strength is above or below designated thresholds.

More particularly, the BTS may provide the WCD with a handoff direction message (HDM), which indicates (i) the PN offsets of the wireless coverage areas in the WCD's active set, and (ii) the following handoff parameters that relate to pilot signal strength:

T_ADD: Threshold pilot strength for addition to the active set (e.g., −14 decibels)
T_COMP: Difference in signal strength from an active set pilot (e.g., 2 decibels)
T_DROP: Threshold pilot strength for removal from the active set (e.g., −16 decibels)
T_TDROP: Time for which an active set pilot falls below T_DROP to justify removal from the active set (e.g., 2 seconds)

Additionally, the BTS may provide the WCD with a Neighbor List Update Message (NLUM), which identifies the WCD's "neighbor" wireless coverage areas.

The WCD may then monitor the pilot signals that it receives, measuring signal strength for each as $E_c/I_o$, where $E_c$ is energy per CDMA chip for the pilot signal of a given wireless coverage area and $I_o$ is the total power received. Values of $E_c/I_o$ may range from 0 dB (very good signal strength) to −16 dB (very poor signal strength). It should be understood that $E_c/I_o$ measures a signal-to-noise ratio, but other methods of measuring signal strength, as well as other ranges of signal strength values, may be used.

If the pilot signal strength of any neighbor wireless coverage area exceeds T_ADD, the WCD may add the pilot to its "candidate" set, and transmit a pilot strength measurement message (PSMM) to the BSC with information indicative of the identity of the wireless coverage area. If the pilot strength exceeds any active wireless coverage area signal by T_COMP, and the BSC may then transmit an HDM to the WCD, listing the pilot as a new member of the active set. Upon receipt of the HDM, the WCD may add the pilot to its active set as instructed, and transmit a Handoff Completion Message (HCM) to the BSC, acknowledging the instruction, and providing a list of the pilots (i.e., PN offsets) in its active set. This process of the WCD adding a new wireless coverage area to its active set may be referred to as a soft handoff.

If the WCD detects that the signal strength of a pilot channel in its active set drops below T_DROP, the WCD starts a handoff drop timer. If T_TDROP passes without this signal strength exceeding T_DROP, the WCD then transmits a PSMM to the BSC, indicating the wireless coverage area and the detected $E_c/I_o$. The BSC may then respond by transmitting an HDM to the WCD, without the wireless coverage area in the active set. The WCD may then receive the HDM and responsively move the wireless coverage area to its neighbor set and transmit an HCM to the BSC.

In this way, while the WCD is actively communicating (e.g., transmitting and/or receiving bearer data), the WCD may be receiving such communications from more than one wireless coverage area. Further, as the WCD moves about or the wireless channel conditions between the WCD and its serving BTS(s) change, membership in the WCD's active set, candidate set, neighbor set, and remaining set may also change. Generally speaking, the larger the WCD's active set, the more likely it is that the WCD will receive bearer data correctly.

Given the advantages of a WCD having more than one wireless coverage area in its active set, CASHO has been proposed, wherein a WCD can be assigned traffic channels from multiple wireless coverage areas at call initiation. Thus, using CASHO procedures may increase the quality of the initial portions of the WCD's calls.

Figure 4:
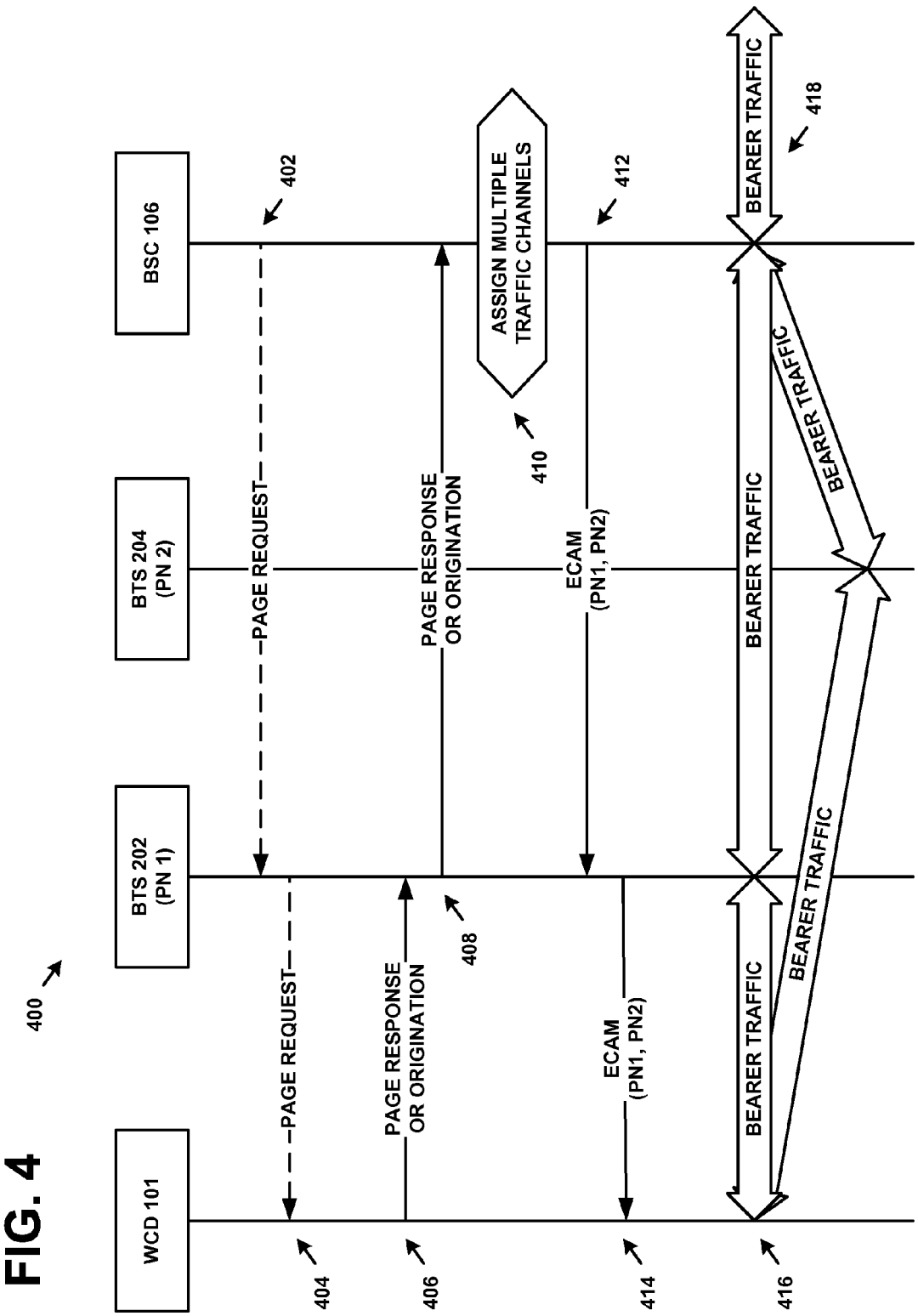
FIG. 4 is a first message flow, in accordance with an example embodiment.

For purposes of illustration, FIG. 4 shows an example message flow 400 of CASHO procedures. FIG. 4 involves WCD 101, BTS 202 defines a wireless coverage area with PN offset 1 ("PN 1"), and BTS 204 defines another wireless coverage area with PN offset 2 ("PN 2"). BTS 202 and BTS 204 are controlled by BSC 106. WCD 101 may be able to receive pilot channel signals of sufficient strength from both PN 1 and PN 2 such that WCD could communicate effectively via either of these wireless coverage areas. Preferably, WCD 101 reports, to BSC 106, the signal strengths at which WCD 101 receives the pilot channels of PN 1 and PN2. This reporting may occur through the transmission of PSMMs, or via a different type of messages.

Steps 402 and 404 illustrate BSC 106, via BTS 202, transmitting an optional page request message to WCD 101. Such a page request message may be transmitted when WCD 101 is paged to answer an incoming voice call or to receive incoming data. Steps 406 and 408 illustrate WCD 101 transmitting a message via BTS 202 to BSC 106. This message may be a page response message transmitted on the access channel in response to the optional page request message. Alternatively, this message may be an origination message, also transmitted on the access channel, with which WCD 101 is attempting to establish an outgoing voice or data call. Additional alternative message types may also be used for this purpose, and any such message may be transmitted on the access channel or another type of channel.

Regardless of whether an incoming or outgoing call is being established for WCD 101, at step 410, BSC 106 may assign multiple traffic channels to WCD 101. In particular, BSC 106 may assign one traffic channel from PN 1, and another traffic channel from PN 2, to WCD 101, in accordance with CASHO procedures. When making the traffic channel assignment, BSC 106 may consider pilot channel signal strength measurements that it received from WCD 101. BSC 106 may receive these signal strengths in PSMMs, the page response or origination message of steps 406 and 408, or in some other type of message. In any case, BSC 106 may use these received signal strengths, and/or other information, when determining to perform CASHO procedures.

At steps 412 and 414, BSC 106 may transmit an enhanced channel assignment message (ECAM) via BTS 202 to WCD 101. The ECAM may include traffic channel assignments for both PN 1 and PN 2. In other words, the ECAM may instruct WCD 101 to use a particular Walsh code with PN 1 and another Walsh code with PN 2. Accordingly, at steps 416 and 418, WCD 101 may begin transmitting and receiving bearer traffic via both BTS 202 (using PN 1) and BTS 204 (using PN 2). Thus, via both BTS 202 and BTS 204, WCD 101 may receive forward direction bearer traffic streams from BSC 106, and may combine these streams into a single stream of bearer traffic. Conversely, via both BTS 202 and BTS 204, BSC 106 may receive reverse direction bearer traffic streams from WCD 101, and may also combine these streams into a single stream of bearer traffic.

It should be understood that rather than traversing BTS 202, any of the page request messages, page response or origination messages, and/or ECAMs may instead traverse BTS 204. Further, the names of these messages are used for purposes of convenience and messages with other names may be used for similar purposes. Additionally, CASHO procedures may be performed such that more than two traffic channels are assigned to a WCD during call initiation.

III. Assigning Traffic Channels to WCDs Based on Soft Handoff Capabilities

Typically, a RAN will serve resource requests, such as traffic channel requests, in a first-come-first-served fashion. However, doing so may lead to the RAN allocating resources to WCDs inefficiently. For example, suppose that WCD 101 and WCD 102 were both in the process of establishing calls via BSC 106. Suppose further that WCD 101 was only within range of PN 1, but WCD 102 was within range of PN 1 and PN 2, and that PN 1 has only one remaining traffic channel resource (e.g., one remaining Walsh code). Then, if a resource request from WCD 102 arrives at BSC 106 before a resource request from WCD 101, BSC 106 may use CASHO procedures to assign traffic channels from PN 1 and PN 2 to WCD 102. Included in this assignment would be the only remaining traffic channel of PN 1. Therefore, WCD 101 would be unable to acquire a traffic channel from PN 1. As a result, WCD 101 may suffer a dropped call or begin roaming to a different wireless service provider. In the latter case, even though WCD 101 would be afforded wireless service, the home service provider or user of WCD 101 may be subject to roaming fees charged by the different wireless service provider.

Figure 5:
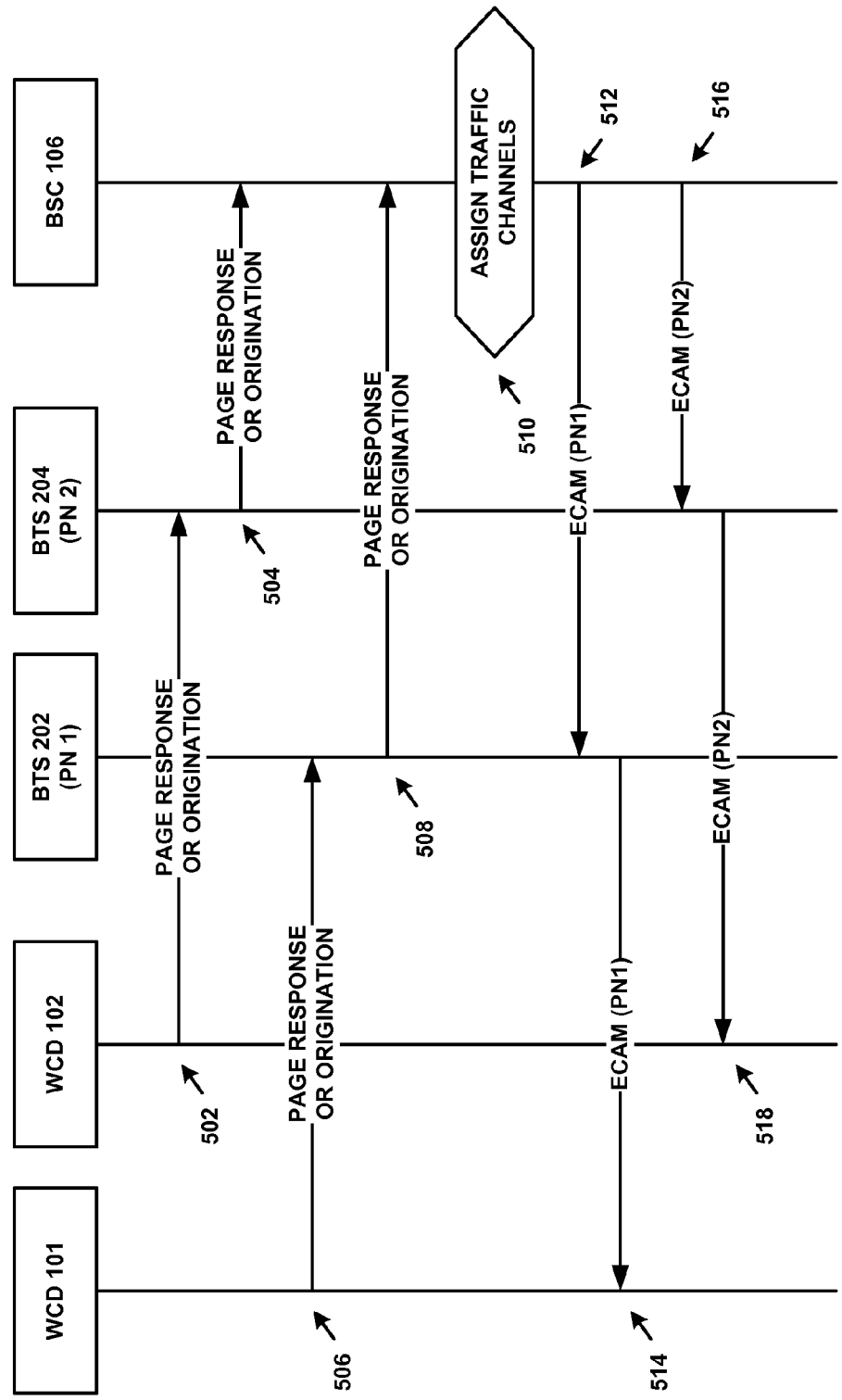
FIG. 5 is a second message flow, in accordance with an example embodiment.

FIG. 5 illustrates an embodiment in which the RAN may perform channel assignments to WCDs on a basis other than first-come-first-served. Consequently, some of the inefficiencies resulting from first-come-first-served channel assignments may be avoided. Message flow 500 of FIG. 5 involves WCDs 101 and 102. Both of these WCDs may be served by one or more BTSs, such as BTS 202 and/or BTS 204. These BTSs may be controlled by BSC 106. As in the example illustrated by FIG. 4, BTS 202 may define wireless coverage area PN 1, and BTS 204 may define wireless coverage area PN 2. In message flow 500, it is assumed that WCD 101 is only within range of PN 1, but WCD 102 is within range of PN 1 and PN 2, and that PN 1 has only one remaining traffic channel resource.

At steps 502 and 504, WCD 102 may transmit, via BTS 204, a page response message or origination message to BSC 106. (For purposes of simplicity, optional page request messages are omitted from FIG. 5.) Normally, accordingly to CASHO procedures, BSC 106 may assign traffic channel resources to WCD 102 in response to receiving a page response message or origination message from WCD 102. However, in an example embodiment, BSC 106 may wait a period of time before making traffic channel assignments. This period of time may be some number of milliseconds or seconds. For instance, BSC 106 may be arranged to make channel assignments every n milliseconds, where n could take on values such as 50 milliseconds, 200 milliseconds, 500 milliseconds, 1000 milliseconds, and so on. When making traffic channel assignments, BSC 106 may consider the needs of additional WCDs that have requested traffic channels during the n-millisecond interval since the last traffic channel assignments were made. Therefore, if BSC 106 also receives a page response message or origination message from WCD 101 during the n-millisecond interval, BSC may consider the traffic channel requests of both WCD 101 and WCD 102 when making these assignments.

To that point, at steps 506 and 508, WCD 101 may transmit, via BSC 202, a page response message or origination message to BSC 106. Preferably, BSC 106 receives this message within the same n-millisecond interval as BSC 106 received the page response or origination message from WCD 102. Then, at step 510, BSC 106 may assign traffic channels to WCD 101 and WCD 102. When making these assignments, BSC 106 may attempt to ensure that all WCDs requesting traffic channels are assigned at least one traffic channel. Thus, BSC 106 may, from pilot channel signal strength reports received from each WCD, determine that WCD 101 is only within range of PN 1 and WCD 102 is within range of PN 1 and PN 2. Additionally, BSC 106 may consider that PN 1 has only one unassigned traffic channel resource. Therefore, in order to avoid WCD 101 not being assigned any traffic channel resources, BSC 106 may assign the remaining traffic channel resource in PN 1 to WCD 101, and a traffic channel resource from PN 2 to WCD 102.

These assignments are reflected in the remaining steps of message flow 500. At steps 512 and 514, BSC 106 may transmit an ECAM to WCD 101, thereby instructing WCD 101 to use a particular Walsh code with PN 1. Similarly, at steps 516 and 518, BSC 106 may transmit an ECAM to WCD 102, thereby instructing WCD 102 to use a particular Walsh code with PN 2. As a result, both WCD 101 and WCD 102 are assigned traffic channels when first-come-first-served CASHO procedures would not have assigned WCD 101a traffic channel.

The techniques illustrated by the example of message flow 500 may be generalized to include situations in which more than two WCDs are requesting traffic channel resources that can be assigned from more than two wireless coverage areas. Some individual WCDs could potentially be assigned three or more traffic channels during CASHO procedures. Further, message flow 500 may be altered to include more or fewer steps, and any steps of message flow 500 may be arranged differently without departing from the scope of the invention.

Additionally, BSC 106 need not completely forego CASHO procedures when considering the needs of multiple WCDs. For instance, if WCD 102 can be assigned a traffic channel from a third wireless coverage area (not shown), then BSC 106 may assign traffic channels from both the second and third wireless coverage areas to WCD 102, while assigning the traffic channel from the first wireless coverage area to WCD 101.

Figure 6:
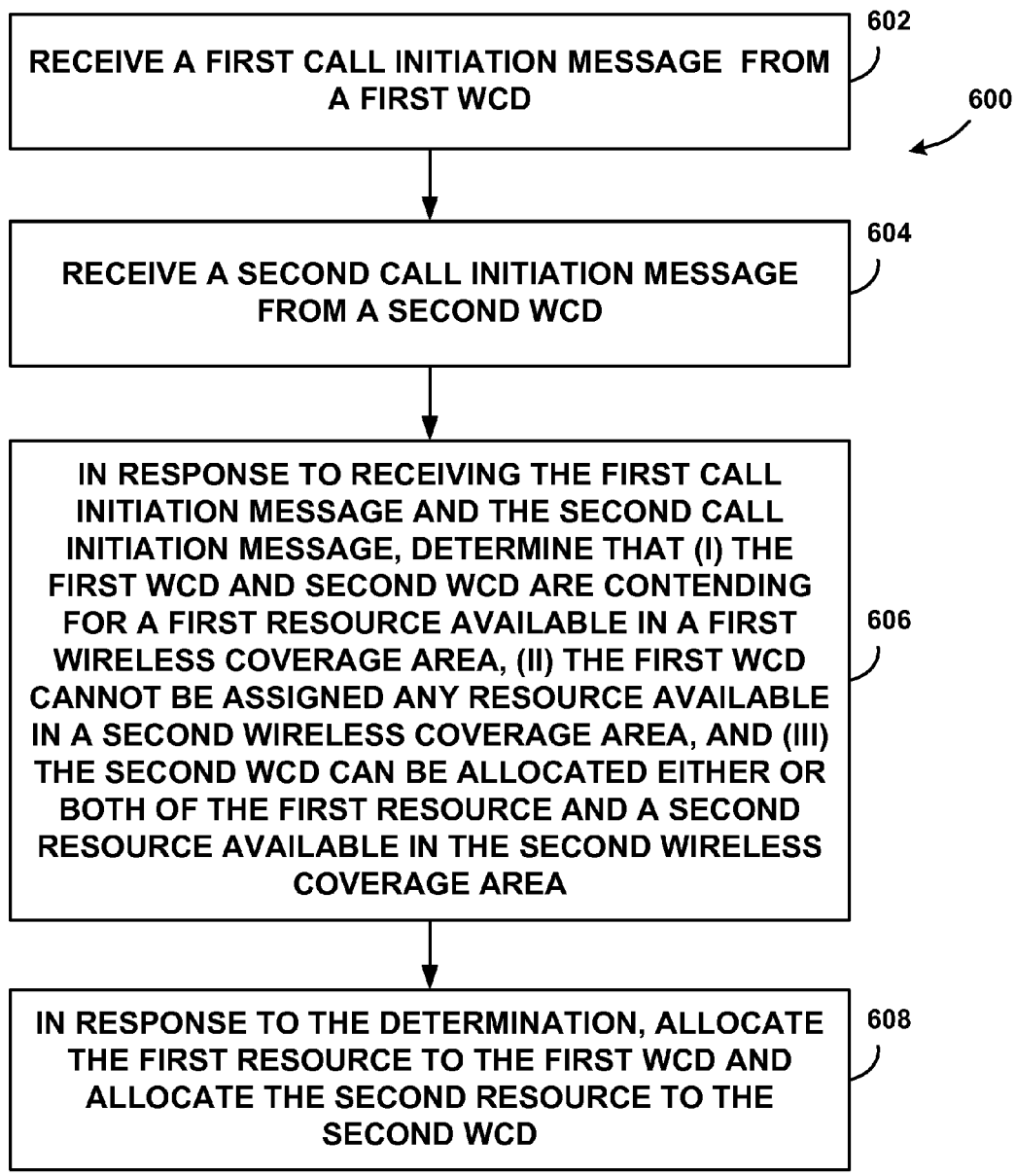
FIG. 6 is a first flow chart, in accordance with an example embodiment.
Figure 7:
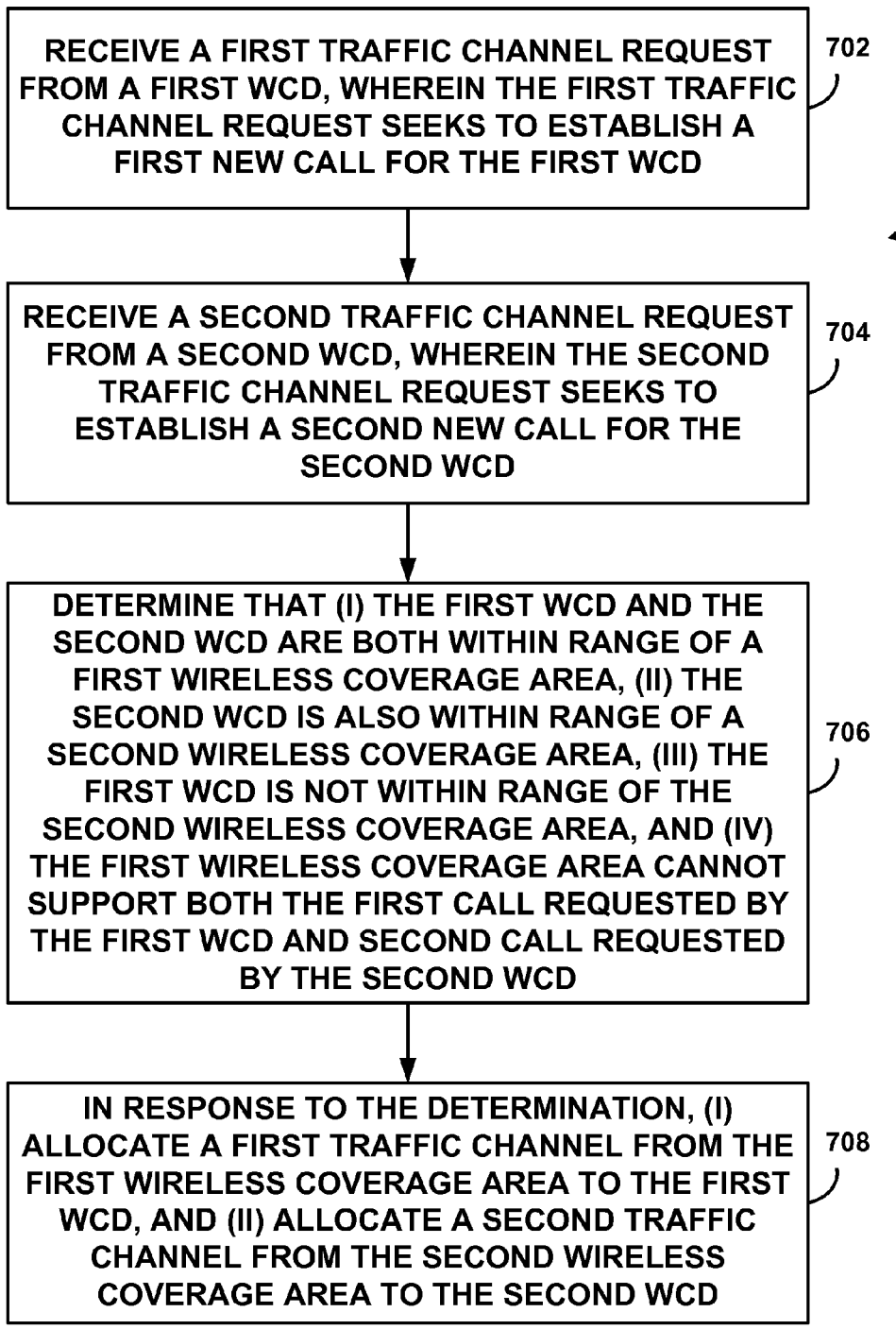
FIG. 7 is a second flow chart, in accordance with an example embodiment.

FIGS. 6 and 7 provide example embodiments through which a RAN component, such as a BSC, may allocate traffic channels to WCDs. Flow chart 600 of FIG. 6 involves a first WCD and a second WCD each initiating a call via the RAN component. Thus, at step 602, the RAN component may receive a first call initiation message from a first WCD. Thereafter, at step 604, the RAN component may receive a second call initiation message from a second WCD. The first and second call initiation messages may take the form of page response messages, origination messages, or some other type of message.

At step 606, in response to receiving the first call initiation message and the second call initiation message, the RAN component may determine that the first WCD and second WCD are contending for a first resource available in a first wireless coverage area of the RAN. This first resource may be any type of resource. For instance, the first resource may comprise a traffic channel, a Walsh code, a time-division-multiplexed slot, a frequency, memory or processing capacity at the RAN component, backhaul capacity between the RAN component and another network element, or any combination thereof. The first and second WCDs may be contending for the first resource because the first resource is the only resource of a given type available in the first wireless coverage area.

As part of the determination, the RAN component may conclude that first WCD cannot be assigned any resource from another wireless coverage area. For example, the first wireless coverage area may be the only wireless coverage area in the active set of the first WCD. As a result, CASHO procedures may not be available for the first WCD, and if the first WCD is not allocated a resource from the first wireless coverage area, the first WCD is likely to begin roaming or suffer a call failure.

Additionally, the RAN component may determine that the second WCD can be allocated either or both of the first resource and a second resource available in the second wireless coverage area. For example, the second WCD may be within range of both the first and the second wireless coverage areas. In other words, the second WCD may be a candidate for CASHO procedures.

At step 608, in response to making one or more of these determinations, the RAN component may allocate the first resource to the first WCD and allocate the second resource to the second WCD. In this way, both WCDs are granted resources in a situation that might otherwise have led to only the second WCD being granted resources. Then, the RAN component may use the first resource to conduct a first call involving the first WCD, and use the second resource to conduct a second call involving the second WCD.

It should be noted that the exact arrangement of BTSs and wireless coverage areas defined by these BTSs may vary. Thus, for example, the RAN may contain a first BTS that radiates to define the first wireless coverage area and a second BTS that radiates to define the second wireless coverage area. Alternatively, the RAN may contain a BTS that radiates to define both the first wireless coverage area and the second wireless coverage area. Other arrangements are also possible.

Flow chart 700 of FIG. 7 illustrates another example embodiment. At step 702, a RAN component may receive a first traffic channel request from a first WCD. The first traffic channel request preferably seeks to establish a first new call for the first WCD. At step 704, the RAN component may also receive a second traffic channel request from a second WCD. Similarly, the second traffic channel request preferably seeks to establish a second new call for the second WCD. The first and second traffic channel requests may take the form of page response messages, origination messages, or some other type of message.

At step 706, the RAN component may determine that the first WCD and the second WCD are both within range of a first wireless coverage area, the second WCD is also within range of a second wireless coverage area, the first WCD is not within range of the second wireless coverage area, and the first wireless coverage area cannot support both the first call requested by the first WCD and second call requested by the second WCD.

At step 708, in response to the determination, the RAN may allocate a first traffic channel from the first wireless coverage area to the first WCD, and allocate a second traffic channel from the second wireless coverage area to the second WCD. The first and second WCDs may then communicate with correspondent nodes using these respective traffic channels.

It should be understood that flow charts 600 and 700 are non-limiting embodiments. Thus, more or fewer steps than shown in FIGS. 6 and 7 may be used without departing from the scope of the invention. Additionally, each and any of these steps may be repeated one or more times, or may be omitted altogether. Moreover, these steps may occur in a different order than shown in FIGS. 6 and 7. Further, flow charts 600 and 700 may be combined with one another, in whole or in part, also without departing from the scope of the invention.

IV. Conclusion

Example embodiments have been described above. Those skilled in the art will understand, however, that changes and modifications may be made to these embodiments without departing from the true scope and spirit of the invention, which is defined by the claims.

What is claimed is:

1. A method comprising:
a radio access network (RAN) receiving a first call initiation message from a first wireless communication device (WCD);
the RAN receiving a second call initiation message from a second WCD, wherein the RAN receives both the first call initiation message and the second call initiation message within a 500-millisecond interval;
in response to receiving the first call initiation message and the second call initiation message within the 500-millisecond interval, the RAN making a determination that (i) a first resource of a first wireless coverage area of the RAN cannot be assigned to both the first WCD and second WCD, (ii) the first WCD cannot be assigned any resource available in a second wireless coverage area of the RAN, and (iii) the second WCD can be allocated either or both of the first resource and a second resource available in the second wireless coverage area; and
in response to the determination, the RAN allocating the first resource to the first WCD and allocating the second resource to the second WCD.

2. The method of claim 1, wherein the first resource and the second resource are communication channels.

3. The method of claim 1, wherein the first resource and the second resource are Walsh codes.

4. The method of claim 1, further comprising:
in response to receiving the first call initiation message and the second call initiation message, the RAN also determining that the first WCD is likely to begin roaming if the first WCD is not allocated the first resource.

5. The method of claim 1, wherein determining that the first resource of the first wireless coverage area of the RAN cannot be assigned to both the first WCD and second WCD comprises determining that the first resource is the only resource of a given type available in the first wireless coverage area.

6. The method of claim 1, wherein the RAN contains a first base transceiver station (BTS) that defines the first wireless coverage area, and the RAN also contains a second BTS that defines the second wireless coverage area.

7. The method of claim 1, wherein the RAN contains a base transceiver station (BTS) that defines the first wireless coverage area and the second wireless coverage area.

8. The method of claim 1, further comprising:
in response to receiving the first call initiation message and the second call initiation message, the RAN also determining that channel-assignment-into-soft-handoff (CASHO) procedures are available for the second WCD but not for the first WCD.

9. The method of claim 1, further comprising:
the RAN using the first resource to conduct a first call involving the first WCD; and
the RAN using the second resource to conduct a second call involving the second WCD.

10. A method comprising:
a radio access network (RAN) receiving a first traffic channel request from a first wireless communication device (WCD), wherein the first traffic channel request seeks to establish a first call for the first WCD;
the RAN receiving a second traffic channel request from a second WCD, wherein the second traffic channel request seeks to establish a second call for the second WCD;
the RAN making a determination that (i) the first WCD and the second WCD are both within range of a first wireless coverage area, (ii) the second WCD is also within range of a second wireless coverage area, (iii) the first WCD is not within range of the second wireless coverage area, (iv) the first wireless coverage area cannot support both the first call requested by the first WCD and second call requested by the second WCD, and (v) the RAN has received both the first traffic channel request and the second traffic channel request within a 500-millisecond interval; and
in response to the determination, the RAN (i) allocating a first traffic channel from the first wireless coverage area to the first WCD, and (ii) allocating a second traffic channel from the second wireless coverage area to the second WCD.

11. A system comprising:
at least one base transceiver station (BTS) configured to define a first wireless coverage area and a second wireless coverage area;
at least one processor;
at least one data storage; and
program instructions, stored in the at least one data storage and executable by the at least one processor to (i) receive a first call initiation message from a first wireless communication device (WCD), (ii) receive a second call initiation message from a second WCD, wherein the RAN receives both the first call initiation message and the second call initiation message within a 500-millisecond interval, (iii) in response to receiving the first call initiation message and the second call initiation message within the 500-millisecond interval, make a determination that (a) a first resource of a first wireless coverage area of the RAN cannot be assigned to both the first WCD and second WCD, (b) the first WCD cannot be assigned any resource available in the second wireless coverage area, and (c) the second WCD can be allocated either or both of the first resource and a second resource available in the second wireless coverage area, and (iv) in response to the determination, allocate the first resource to the first WCD and the second resource to the second WCD.

12. The system of claim 11, wherein the first resource and the second resource are communication channels.

13. The system of claim 11, further comprising:
program instructions, stored in the at least one data storage and executable by the at least one processor to, in response to receiving the first call initiation message and the second call initiation message, also determine that the first WCD is likely to begin roaming if the first WCD is not allocated the first resource.

14. The system of claim 11, wherein the program instructions to determine that the first resource of the first wireless coverage area of the RAN cannot be assigned to both the first WCD and second WCD comprise program instructions to determine that the first resource is the only resource of a given type available in the first wireless coverage area.

15. The system of claim 11, wherein the at least one BTS comprises:
a first BTS configured to define the first wireless coverage area; and
a second BTS configured to define the second wireless coverage area.

16. The system of claim 11, wherein the at least one BTS comprises a single BTS that is configured to define the first wireless coverage area and the second wireless coverage area.

17. The system of claim 11, further comprising:
program instructions, stored in the at least one data storage and executable by the at least one processor to, in response to receiving the first call initiation message and the second call initiation message, also determine that channel-assignment-into-soft-handoff (CASHO) procedures are available for the second WCD but not for the first WCD.

18. The system of claim 11, further comprising:
program instructions, stored in the at least one data storage and executable by the at least one processor to (i) use the first resource to conduct a first call involving the first WCD, and (ii) use the second resource to conduct a second call involving the second WCD.

* * * * *